United States Patent
Wasmuth

(10) Patent No.: US 7,093,864 B2
(45) Date of Patent: Aug. 22, 2006

(54) CONNECTING ELEMENT FOR PIPES AND METHOD FOR WELDING A CONNECTING ELEMENT ONTO THE END OF A PIPE

(75) Inventor: Ernst A. Wasmuth, Essen (DE)

(73) Assignee: AVIT Hochdruck-Rohrtechnik GmbH, Essen (DE)

( * ) Notice: Subject to any disclaimer, the term of this patent is extended or adjusted under 35 U.S.C. 154(b) by 0 days.

(21) Appl. No.: 10/475,135

(22) PCT Filed: Apr. 22, 2002

(86) PCT No.: PCT/DE02/01466

§ 371 (c)(1),
(2), (4) Date: Mar. 18, 2004

(87) PCT Pub. No.: WO02/085606

PCT Pub. Date: Oct. 31, 2002

(65) Prior Publication Data

US 2004/0145183 A1    Jul. 29, 2004

(30) Foreign Application Priority Data

Apr. 20, 2001   (DE) ............... 201 06 919 U
Sep. 7, 2001    (DE) ............... 101 44 039

(51) Int. Cl.
*F16L 25/00* (2006.01)

(52) U.S. Cl. ............ 285/389; 285/343; 285/342; 285/288.1

(58) Field of Classification Search ............ 285/288.1, 285/288.11, 288.4, 382.7, 387, 388, 389, 285/384, 3; 29/237; 228/112.1, 171
See application file for complete search history.

(56) References Cited

U.S. PATENT DOCUMENTS

| 2,693,374 | A | * | 11/1954 | Wurzburger | ........... 285/343 |
| 2,737,403 | A | * | 3/1956 | Ellis | ........... 285/334.2 |
| 3,439,941 | A | * | 4/1969 | Nicol | ........... 285/288.1 |
| 3,751,077 | A | * | 8/1973 | Hiszpanski | ........... 285/288.1 |
| 3,857,591 | A | * | 12/1974 | Voss | ........... 285/382.7 |
| 4,810,832 | A | * | 3/1989 | Spinner et al. | ........... 174/65 SS |
| 5,439,257 | A | * | 8/1995 | Williamson | ........... 285/288.1 |
| 6,592,154 | B1 | * | 7/2003 | Shimizu et al. | ........... 285/332.1 |

\* cited by examiner

*Primary Examiner*—Aaron Dunwoody
(74) *Attorney, Agent, or Firm*—Gudrun E. Huckett

(57) ABSTRACT

The invention relates to a connecting element for welding onto a circular front face of a pipe, said element having an annular region, (friction region), that can be friction welded to said front face. The connecting element can be welded onto the end of a pipe with a substantially circular front face in a particularly simple, rapid and cost-effective manner. Said element, together with additional components, e.g. a coupling nut and a threaded sleeve enables a tight connection of the pipe to other components, even under extreme pressure and temperature fluctuations.

19 Claims, 4 Drawing Sheets

CONNECTING ELEMENT FOR PIPES AND METHOD FOR WELDING A CONNECTING ELEMENT ONTO THE END OF A PIPE

BACKGROUND OF THE INVENTION

The invention relates to a connecting element for pipes and a method for welding a connecting element to the end of a pipe. In this connection, the connecting element is designed for being welded to a circular ring-shaped, optionally beveled, end face of a pipe. In particular, the invention relates to a connecting element comprising a conical sealing surface that, when connecting the pipe to other structural components, for example, other pipes, fittings, hoses, and the like, interacts with a sealing surface that is at least partially complementary to it and provided on a connecting element, in particular, a screw fitting or weld fitting listed in DIN EN ISO 8434-1.

Connecting elements of the aforementioned kind are disclosed, for example, in DE 1 960 933 U1. They serve for enabling, together with other structural components, such as, in particular, a screw fitting or weld fitting, a union nut, and an annular seal, extremely stress-resistant seal-tight connections (as they are needed, for example, in high-pressure conduits) of pipes with other structural components, for example, additional pipes, fittings, hoses etc.

The connecting element disclosed in the aforementioned DE 1 960 933 U1 has proven to be extremely successful in practice for many years. However, welding of such a connecting element having a circular ring-shaped end face onto an end face of the same kind provided at the end of a pipe is not trivial and must be performed by qualified, specially trained personnel.

When the usual gas welding method is employed in this connection, as a result of burning of alloy elements contained in the material of the connecting element and of the pipe, which, in the case of the relevant pipelines in this context, are generally both made of steel, cinder is produced on the outer side of the pipe as well as on the inner side of the pipe, wherein the cinder produced on the inner side of the pipe generally must be dissolved by a complex after treatment by etching (conventionally with a 13% hydrochloric acid solution) and subsequently flushed out because otherwise, when using the pipe, for example, in the context of a high-pressure hydraulic oil line, the cinder particles could lead to damages of the structural components, for example, hydraulic cylinders.

In order to prevent cinder formation, usually the so-called tungsten inert gas welding method (TIG welding method) under inert gas atmosphere is employed for welding of the connecting element to the end of the pipe. However, in this connection attention must be paid that during welding neither the material to be welded nor welding beads will reach the interior of the pipe. Subsequently, the welding seam must generally be at least cleaned; frequently, it must also be leveled by grinding.

The known welding methods require not only qualified trained personnel, they are also time-consuming and thus particularly cost-intensive.

Also, weld-free pipe connections in the form of so-called flared fittings are known. In this connection, an end of a pipe is deformed (flared) by a machine and a bead is formed by upsetting, wherein the bead forms a shoulder for a union nut that has been slipped over prior to this. Since the upsetting process requires very great forces and since the pipe must be clamped in a direction counter to the upsetting direction, deep clamping grooves are formed on the exterior of the pipe during upsetting. These clamping grooves can damage the grain within the pipe; in particular, in high-pressure hydraulic systems where the pipelines are frequently subjected to significant dynamic loads, this can cause rupture of the pipe.

Moreover, upsetting produces in the interior of the pipe a channel where dirt can collect; this can lead to increased corrosion in the interior of the pipe.

A problem is also the fact that during flaring the pipe is cold-formed and the course of the grain is not cut; this can also lead to tearing of the grain in the material and thus in rupturing of the pipe occurring more easily.

The flared fittings are therefore suitable only to a limited extent, in particular, for very high operating pressures and in pipeline systems where strong vibrations can occur, for example, in certain hydraulic systems.

SUMMARY OF THE INVENTION

The invention has the object, on the one hand, to provide a connecting element that can be welded in a particularly simple, fast, and inexpensive way to the end of the pipe having a substantially circular ring-shaped end face and which, together with additional structural components, for example, a union nut and a screw fitting, enables a connection of the pipe to other structural components that is seal-tight even under extreme pressures and temperature fluctuations.

Moreover, it is an object of the invention to provide a method for welding a connecting element to a circular ring-shaped end face of a pipe which method can be performed in a particularly simple, fast, and inexpensive way even by personnel without welding experience.

With regard to a connecting element, the object is solved by a connecting element of the aforementioned kind that has an annular area, connectable by friction welding to the end face of a pipe, that will be referred to in the following as "friction area".

Such a connecting element has the great advantage that it can be welded to the end of a pipe by friction welding. The structural components to be connected are heated at their connecting surfaces during friction welding by being rubbed locally against one another until a plastic state results and, subsequently, they are connected to one another by a short pressure thrust. The machine required for carrying out friction welding is very simple to operate and requires no highly qualified personnel, as is necessary in the case of TIG welding. Moreover, friction welding is significantly faster than TIG welding.

A further advantage resides in that the time required for welding a connecting element according to the invention to a pipe in the case of steel pipes having conventional outer diameters of up to approximately 50 mm is generally so short that no cinder can be formed so that, advantageously, after processing steps, for example, etching, are no longer needed.

First experiments have demonstrated that welding of a connecting element according to the invention to an end of a pipe by means of friction welding, that can be employed thanks to the invention, can be performed faster by five to seven minutes, including all required preparation work, than comparable welding of the known connecting element to a pipe.

In a preferred embodiment of the invention, it is proposed that the friction area, for a proper alignment relative to the end face of the pipe to which the connecting element is to be welded, tapers in the direction to the end face. This has various advantages. For example, at the beginning of friction welding only a relatively minimal surface area of the friction area rests against the end face of the pipe so that the machine can start up without a great force expenditure while still providing, as a result of the pressure concentrated on the minimal surface area in the contact zone, a significant friction and thus heating, resulting in the desired uniform heating of the parts to be connected to one another.

In addition, the tapering shape ensures that the welding beads, that may be formed at the inner or outer side of the pipe when pressing the parts against one another after heating, project only slightly and that, in particular, a welding bead possibly formed on the inner side of the pipe does not reduce excessively the inner diameter of the pipeline and, accordingly, does not form an obstacle to flow.

It was found to be expedient to provide the tapering friction area with two annular lateral flanks positioned at an angle of approximately 90° to 160° relative to one another, preferably at an angle of approximately 120°. The angle can be selected as a function of the wall thickness of the pipe to be connected by welding and, in the case of pipes having particularly thick walls, the angle can be more obtuse while, in the case of pipes having thin walls, it can also more acute. The conventional wall thickness of the pipes in question is between approximately 1.0 and 5.0 mm.

Moreover, it was found to be advantageous when the friction area has a flattened or rounded tip. When the tip is rounded, those radii of the curvature of the tip were found to be particularly beneficial that are approximately 1 to 10%, preferably approximately 2.5%, of the outer diameter of the pipe to be welded thereto. For pipes to be welded thereto with a typical outer diameter of 16 mm, the radius of the curvature of the friction area can be approximately 0.4 mm.

In a particularly preferred embodiment of the invention, the friction area is formed in the interior of the connecting element; this provides several advantages, wherein the "clean" visual appearance is only the least important one. Leveling of the welding seam by grinding is not needed in this embodiment.

When the friction area is provided in the interior of the connecting element, advantageously an annular circumferentially extending receptacle for a welding bead, resulting during friction welding of the connecting element and the pipe on the outer side of the pipe, can be provided also in the interior of the connecting element adjacent to the friction area. This receptacle prevents that liquefied material that is pushed transversely to the pressing direction when pressing the connecting element against the pipe is forced into the interior of the pipe because of lack of any other space and, in this way, reduces the inner diameter.

Expediently, the receptacle for the welding bead is configured such that its maximum outer diameter is greater than the diameter of a circular receiving opening provided in the connecting element for the pipe to be welded thereto. After cooling of the welding seam, an additional positive-locking connection of the connecting element and the pipe is formed in this way that additionally relieves the welding seam.

In this connection, the smallest diameter of the circular receiving opening formed in the connecting element for the pipe to be connected by welding should be somewhat greater than the outer diameter of the pipe to be connected by welding so that, when friction welding the connecting element and the pipe, it is indeed only the friction area of the connecting element that comes into contact with the pipe.

By which amount the smallest diameter of the receiving opening should be greater than the outer diameter of the pipe depends on the smooth running of the employed friction welding machine. In the case of the machines of the assignee of this application, already very minimal tolerances are sufficient. For example, a receiving opening having a diameter of 16.5 mm is entirely sufficient for pipes with an outer diameter of 16 mm.

In a further preferred embodiment, the outer side of the connecting element facing the pipe to be connected by welding is formed as a contact surface for securing a union nut. Longer fittings, as they are required in the prior art connecting elements, are not necessary. Moreover, the section of the connecting element whose outer side is formed as a contact surface for securing a union nut and therefore requires necessarily a larger outer diameter than, for example, the pipe, can advantageously fulfill a double function in that the optionally provided receptacle for the resulting welding seam can be formed in this section of the connecting element.

Even though the connecting element, depending on the application, can be shaped in any form, a typical connecting element with which the invention is concerned is designed for forming a screw fitting according to DIN EN ISO 8434-1 so that the outer side of the connecting element facing away from the pipe to be connected by welding is formed as a conical sealing surface. In this sealing surface, a circumferential groove for receiving a sealing ring can then be provided.

In regard to the method, as a solution to the aforementioned object a method is proposed wherein a connecting element embodied according to the invention is welded to a circular ring-shaped end face of a pipe in that the connecting element and the pipe are rotated relative to one another about the center axis of the circular ring-shaped end face of the pipe such that the friction area of the connecting element and the end face of the pipe rub against one another until they are heated to the temperature required for a welding connection, whereupon the relative rotation of connecting element and pipe relative to one another is stopped and the end face and the friction area are pressed against one another.

DESCRIPTION OF PREFERRED EMBODIMENTS

Figure 1:
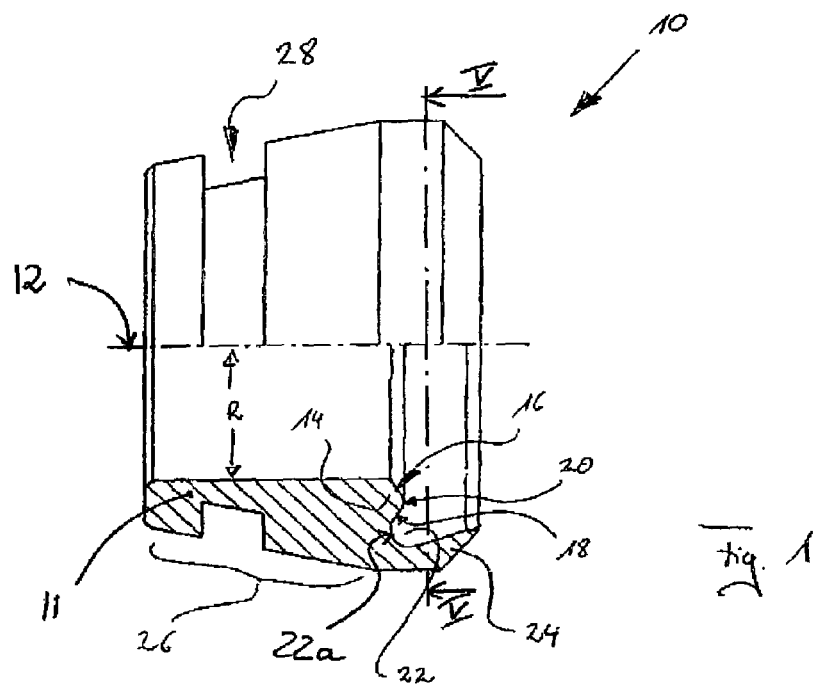
FIG. 1 shows a partially sectioned side view of a connecting element according to the invention.

In the following, an embodiment of the connecting element according to the invention and of a method according to the invention will be described with reference to the drawing in a purely exemplary and non-limiting way.

In FIG. 1, the connecting element, which in its entirety is referenced at 10, for welding to a circular ring-shaped end face of a pipe is shown partially in a sectioned side view viewed perpendicularly to the center axis 12 of the connecting element 10 that is of rotational symmetry in this embodiment. In this connection it should be noted that the term "circular ring-shaped" not only refers to plane end faces. The end faces can be instead of any desired contour, in particular, can also be curved outwardly or inwardly. It is only important that the end faces in the projection along the axis, about which during friction welding the connecting element and the pipe rotate relative to one another, are circular like a plane circular ring and not oval.

The connecting element 10 has in its interior an area which can be heated by rubbing against an end face of a correspondingly sized pipe to reach a plastic state such that the connecting element 10 can be welded with the matching pipe in a so-called friction welding process. This specially formed area is therefore referred to in this application as a friction area 14.

In this embodiment, when properly inserting a pipe, not illustrated in FIG. 1, into the connecting element 10 or when placing the connecting element 10 onto an end of such a pipe, the friction area 14 is curved toward the end face of the pipe with which the connecting element is to be connected by welding and has two lateral flanks 16 and 18 that in this embodiment are positioned at an angle of approximately 120° relative to one another and pass into one another in the area of the rounded tip 20.

The free inner radius R of the connecting element corresponds in this embodiment to the free inner radius of a pipe to be connected thereto, wherein in this context it should be noted that the connecting element can, of course, also have any other inner contour and, for example, can be formed as a reducer.

Because of the curvature of the friction area 14 not only a particularly advantageous course of the friction welding process is ensured but also a minimization of the welding bead resulting on the inner side when friction welding the connecting element 10 and the pipe so that the flows through a welded-on pipe and through the connecting element are practically not impaired by the welding bead if a welding bead is formed at all.

For further minimization of the welding head produced on the inner side of the pipe, in a particularly advantageous embodiment an annular circumferentially extending receptacle 22 having a bottom 22a is formed adjacent to the friction area 14 in which receptacle the material of the connecting element and of the pipe to be welded thereto can be received, which material is liquefied during friction welding and forced outwardly initially by means of centrifugal forces and then by pressure forces and thus forms a welding seam.

The connecting element has a shoulder section 24 with an annular outer flank and an annular inner flank at its end facing the pipe in a position of proper alignment of the connecting element and the pipe to be welded thereto.

The inner flank of the shoulder section 24 delimits a circular receiving opening for a pipe to be welded thereto. As illustrated in FIG. 1, the diameter of this receiving opening is significantly smaller than the maximum outer diameter of the annular circumferentially extending receptacle 22 for the welding bead. Viewed in the direction of the center axis 12, it can therefore be stated that the receiving opening is undercut wherein undercut angles between 10° and 30°, preferably approximately 20°, relative to the center axis 12 of the connecting element were found to be beneficial.

This embodiment has not only the advantage that even for greatest centrifugal forces during friction welding no liquefied material can be torn off and thrown off the pipe or the connecting element because such material is collected in the receptacle 22, but there is also the advantage that the material that cools within the receptacle 22 provides an additional positive-locking connection with the inner flank of the undercut shoulder section 24; this relieves additionally the welding seam formed by welding.

The outer flank of the shoulder section 24 forms a contact surface for holding a union nut. The outer side 26 of the connecting element 10 facing away from the pipe to be welded thereto is embodied as a conical sealing surface and has a circumferentially extending groove 28 for receiving a sealing ring, not illustrated.

The connecting element can be formed of any suitable material matched to the respective application, preferably as a monolithic part. Since the connecting element 10 is however generally used for high-pressure hydraulic oil lines, it will be generally comprised of standard steel, like the pipe to be welded thereto. Materials can also include stainless steel and austenitic materials as well as materials such as brass, titanium, heat-resistant steels, or CuNiFe alloys.

Figure 2:
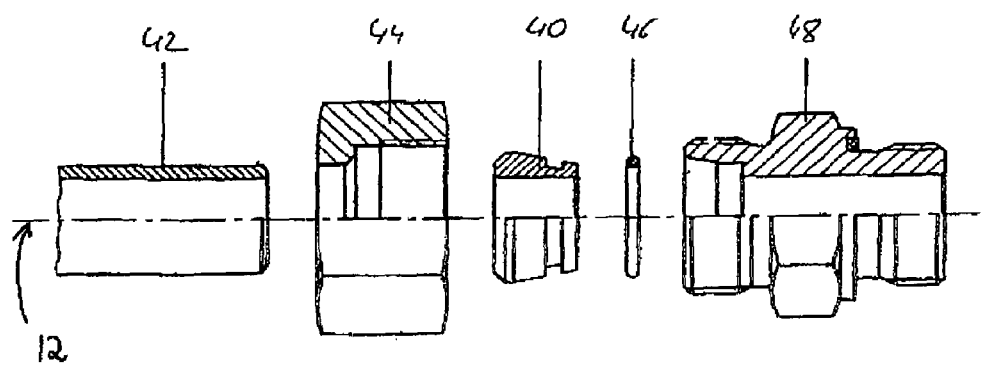
FIG. 2 shows a partially sectioned side view of various structural components in the unmounted state before producing a pipe connection.

In FIG. 2, the different structural components for manufacturing a pipe connection by using the connecting element 40 according to the invention are illustrated, wherein the connecting element 40 corresponds substantially to the connecting element 10 of FIG. 1. It should be noted that this purely principal sketch does not illustrate the precise configuration of the friction area of the connecting element 40.

The other structural components illustrated in this Figure are: a pipe 42, illustrated only partially; a union nut 44; an O-ring seal 46; and a so-called screw fitting 48 according to DIN EN ISO 8434-1.

Figure 3:
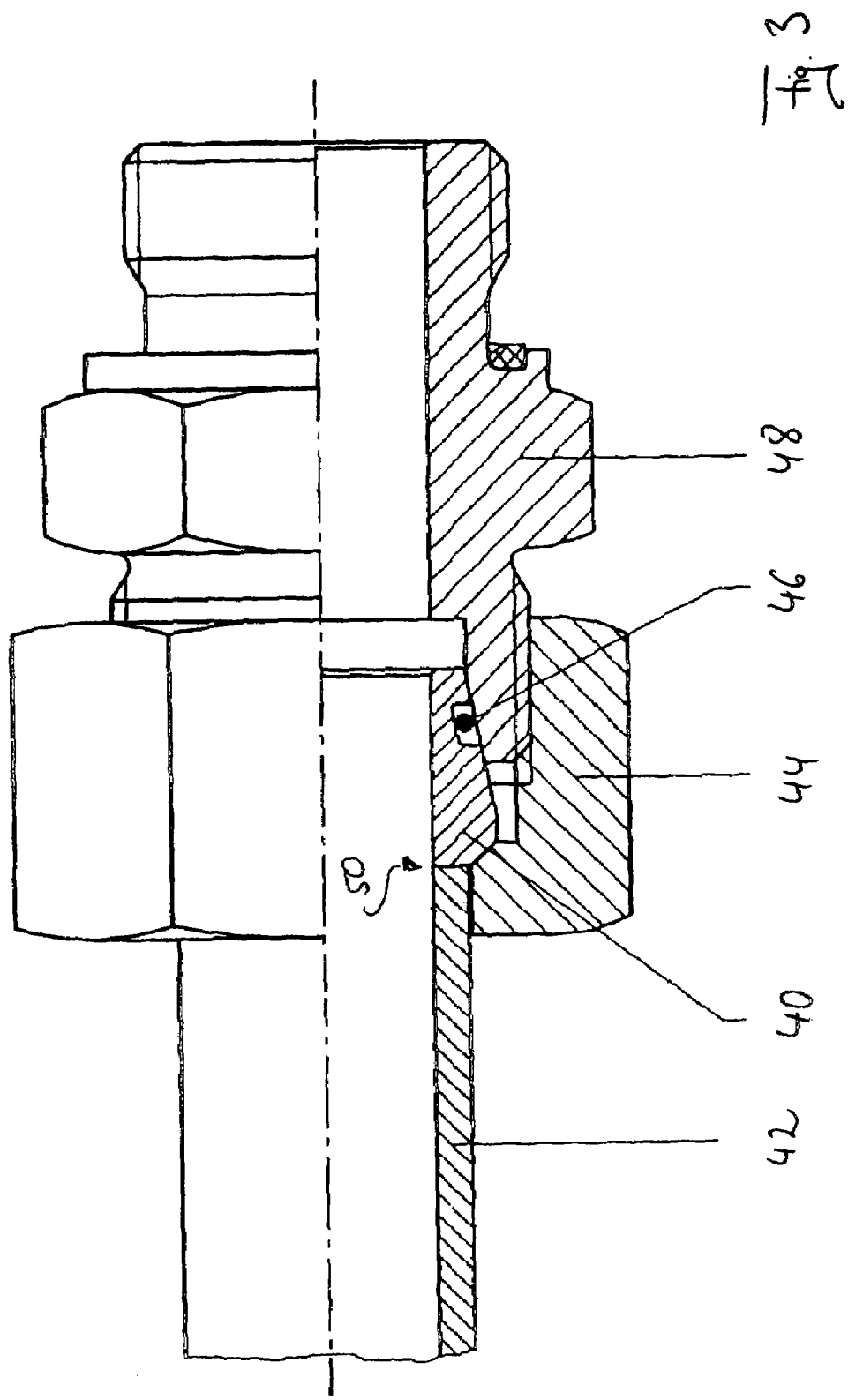
FIG. 3 shows a partially sectioned side view of the structural elements according to FIG. 2 in the mounted state.

FIG. 3 shows the components according to FIG. 2 in the mounted state.

When mounting the illustrated screw connection, in the first method step the connecting element 40 is welded to the pipe 42 by means of a friction welding machine that rotates the pipe and the connecting element in fast rotation relative to one another.

Figure 4:
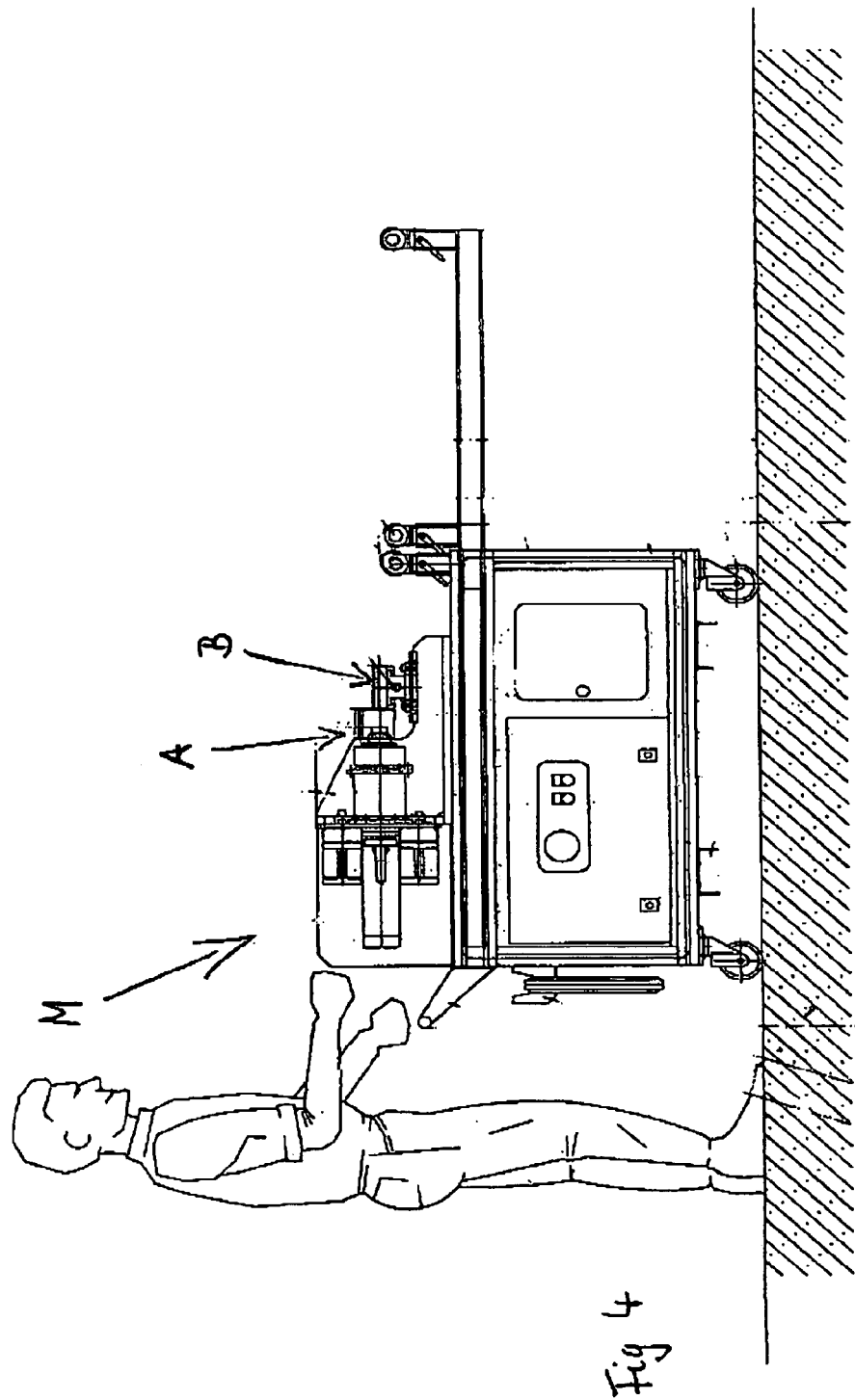
FIG. 4 shows a mobile friction welding machine with friction welding head and clamping device.
Figure 5:
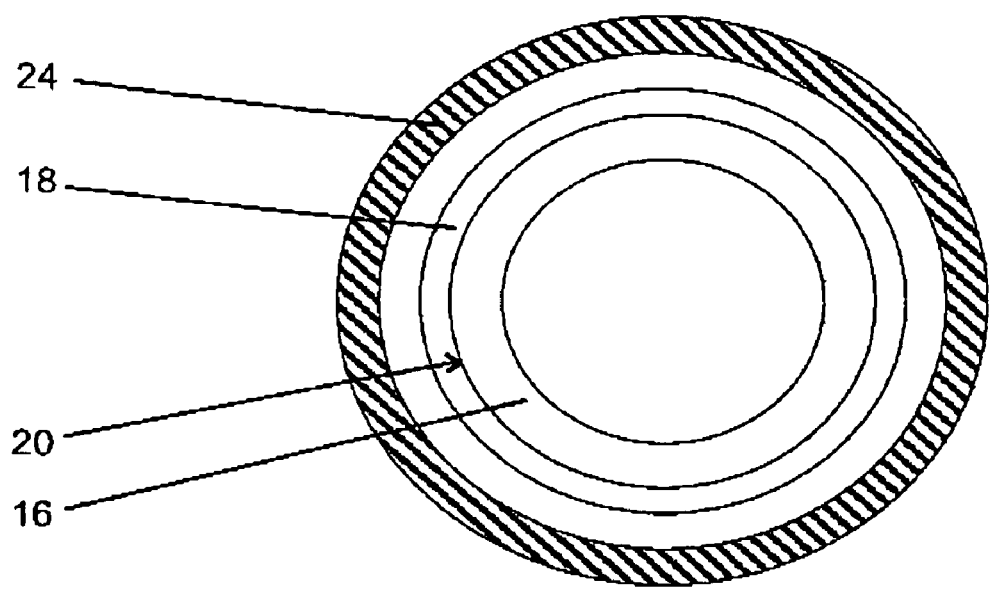
FIG. 5 shows a section along section line V—V of FIG. 1 for illustrating the annular friction area.

In this connection, the union nut 44 can already be used for fixation of the connecting element 40 on the so-called friction welding head A of the friction welding machine M (schematically illustrated in FIG. 4). Usually, the friction welding machine M has a receptacle having an inner contour that is at least partially complementary to the outer contour of the connecting element 40 and having an outer contour that is provided with a thread that is complementary to the inner thread of the union nut 44. In this way, the connecting element 40 can be secured by means of the union nut 44 on the friction welding head A.

Subsequently, the pipe 42 is inserted into a clamping device B and secured therein. When friction welding is carried out, the connecting element 40 rotating at a certain rotary speed is pressed for a certain amount of time, the so-called friction time, against the rigid pipe end at a certain pressure, the so-called friction pressure. After the friction time has elapsed, the connecting element is forced at increased pressure, the so-called upsetting pressure, for a certain minimum time, the so-called upsetting time, against the end of the pipe.

As a function of the pipe diameter and the wall thickness of the pipe, certain parameters for the rotary speed, the friction time, the friction pressure, the upsetting time, and the upsetting pressure are preset in the friction welding machine. For the materials and dimensions which are used in this connection these are: typical rotary speeds between approximately 10,000 and 25,000 rpm; typical friction times between 100 and 1,000 milliseconds; typical friction pressures between 1.5 and 2.5 bar; typical upsetting times between 2 and 4 seconds; typical upsetting pressures between 3 and 5 bar. Particularly suitable are the following: rotary speed between 22,000 and 24,000 rpm; friction times between 200 and 300 milliseconds; friction pressures between 1.8 and 2.2 bar; upsetting times between 2.8 and 3.2 seconds, upsetting pressures between 3.8 and 4.2 bar.

After welding of the connecting element 40 to the pipe 42, a pipe screw connection as illustrated in FIG. 3 can be produced in that the pipe with the connecting element 40 and the slipped-on sealing ring 46 can be inserted into a screw fitting 48 and can be clamped thereat by means of the union nut 44.

As illustrated in FIG. 3, the welding seem 50 formed between the connecting element 40 and the pipe 42, when using a connecting element according to FIG. 1, is not only within the connecting element but also within the area enclosed by the nut 44 so that the welding seam is secured twofold against rupturing.

In the context of the inventive idea, numerous deviations and further developments are possible which, for example, relate to the configuration of the contour of the friction area. For example, it is possible, and even particularly expedient for very great wall thicknesses, that a friction area with several curvatures or grooves is provided in place of the illustrated simple curved friction area.

It is in any case important for the invention that the connection element is configured such that it can be welded by friction welding to the end face of a pipe. It should be underscored in this context that it is, of course, also possible to shape the end face of the pipe to be welded accordingly, for example, by providing a curvature. However, since pipes are usually cut to length on site, it will be usually more expedient to provide the corresponding contour on the connecting element rather than deforming the cut-to-length pipe. Beveling of the end face of the cut-to-length pipe is however possible on site without problems and, in general, also expedient.

In this connection, it should be noted also that the application implies a new method of doing business, i.e., the fast and inexpensive welding of connecting elements to pipe ends as a service that can be provided also as a mobile service for third parties. This method is therefore explicitly also encompassed by the invention and claimed in those countries whose national laws allow this.

What is claimed is:

1. A connecting element for welding to a circular ring-shaped end face of a pipe, the connecting element comprising:
   a base member having a first end for receiving a pipe and a second end opposite first end;
   the base member composed of a metal selected from the group consisting of steel, brass, titanium, and CuNiFE alloys;
   the base member having an interior comprising a first axial section extending from the first end inwardly and a second axial section extending from the second end inwardly and having a radius that is smaller than a radius of the first axial section;
   wherein the interior has an annular friction area having an inner radial end and an outer radial end, wherein the inner radial end is connected to an inner end of the second axial section, wherein the annular friction area is configured to be welded by friction welding to an end face of a pipe;
   wherein the annular friction area does not project axially past the first end;
   the base member having a first outer side adjoining the first end and forming a contact surface for securing a union nut;
   the base member having a second outer side adjoining the second end and forming a conical sealing surface;
   wherein the interior has an annular circumferentially extending receptacle for receiving a bead resulting on an outer side of the pipe when friction welding the connecting element to the pipe, wherein the receptacle is positioned radially outwardly of the annular friction area and is connected to the outer radial end of the annular friction area and passes into the second axial section;
   wherein the receptacle has a bottom that is positioned in an axial direction of the base member farther away from the first end than the annular friction area.

2. A connecting element according to claim 1, wherein the annular friction area has in cross section a tapered shape that tapers in a direction toward the first end of the base member, wherein the tapered shape begins at the inner and outer radial ends and has an inner radial flank and an outer radial flank positioned at an angle of approximately 90° to 160° relative to one another.

3. A connecting element for welding to a circular ring-shaped end face of a pipe, the connecting element comprising:
   a base member having a first end for receiving a pipe and a second end opposite the first end;
   the base member composed of a metal selected from the group consisting of steel, brass, titanium, and CuNiFE alloys;
   the base member having an interior;
   the base member having an annular friction area configured to be welded by friction welding to an end face of a pipe, wherein the annular friction area is provided in the interior;
   the base member having a first outer side, facing the pipe, forming a contact surface for securing a union nut;
   the base member having a second outer side, facing away from the pipe, forming a conical sealing surface;
   wherein the annular friction area tapers in a direction toward the first end;
   wherein the annular friction area has two annular lateral flanks extending at an angle of approximately 90° to 160 relative to one another.

4. A connecting element according to claim 3, wherein the angle is approximately 120°.

5. A connecting element according to claim 2, wherein the annular friction area has a flattened tip or a rounded tip.

6. A connecting element for welding to a circular ring-shaped end face of a pipe, the connecting element comprising:
   a base member having a first end for receiving a pipe and a second end opposite the first end;
   the base member composed of a metal selected from the group consisting of steel, brass, titanium, and CuNiFE alloys;
   the base member having an interior;
   the base member having an annular friction area configured to be welded by friction welding to an end face of a pipe, wherein the annular friction area is provided in the interior;
   the base member having a first outer side, facing the pipe, forming a contact surface for securing a union nut;
   the base member having a second outer side, facing away from the pipe, forming a conical sealing surface;
   wherein the annular friction area tapers in a direction toward the first end;

wherein the annular friction area has a rounded tip and wherein the rounded tip has a radius that is approximately 1 to 10% of an outer diameter of the pipe.

7. A connecting element according to claim 6, wherein the radius is approximately 2.5% of the outer diameter of the pipe.

8. A connecting element according to claim 3, wherein the interior, adjacent to the friction area, has an annular circumferentially extending receptacle for receiving a bead resulting on an outer side of the pipe when friction welding the connecting element to the pipe.

9. A connecting element according to claim 1, further comprising a circular receiving opening for the pipe, wherein a maximum outer diameter of the annular circumferentlally extending receptacle is greater than a diameter of the circular receiving opening.

10. A connecting element according to claim 9, wherein a smallest diameter of the circular receiving opening is greater than an outer diameter of the pipe.

11. A connecting element according to claim 1, wherein the conical sealing surface has a circumferentially extending groove for receiving a sealing ring.

12. A combination of a pipe and a connecting element according to claim 1, wherein the pipe and the connecting element are connected to one another by friction welding.

13. A pipe connection comprising:
  at least one pipe;
  a connecting element according to claim 1, welded to the pipe by friction welding;
  a union nut partially surrounding the connecting element and comprising a thread; and
  a screw fitting having a thread complementary to the thread of the union nut.

14. The pipe connection according to claim 13, wherein, upon proper mounting of the union nut and the screw fitting, a welding seam formed between the pipe and the connecting element is located within an area delimited by the union nut.

15. A high-pressure pipeline comprising several pipes and at least one connecting element according to claim 1 connected by friction welding to at least one of the pipes.

16. A multi-part connecting system for pipes, comprising:
  a connecting element according to claim 1;
  a union nut;
  a screw fitting; and
  a sealing ring.

17. A multi-part connecting system according to claim 16, further comprising a friction welding machine for welding the connecting element to a pipe.

18. A multi-part connecting system according to claim 17, wherein the welding machine is mobile.

19. A method for welding a connecting element to a circular ring-shaped end face of a pipe, the method comprising the steps of:
  positioning a connecting element according to claim 1 and a pipe such that the annular friction area of the connecting element and a circular ring-shaped end face of the pipe contact one another;
  performing a relative rotation of the connecting element and the pipe relative to one another about a center axis of the circular ring-shaped end face such that the annular friction area and the end face rub against one another until heated to a temperature required for forming a friction welding connection;
  stopping the relative rotation when the temperature required for forming a friction welding connection is reached; and
  pressing the circular ring-shaped end face and the annular friction area against one another.

* * * * *